(12) United States Patent
Yim

(10) Patent No.: US 6,215,293 B1
(45) Date of Patent: Apr. 10, 2001

(54) PORTABLE STUD DETECTOR FOR DETECTING WOOD, METAL, AND LIVE WIRES

(75) Inventor: Ronald Tak Yan Yim, New Territories (HK)

(73) Assignee: Solar Wide Industrial Limited (HK)

( * ) Notice: Subject to any disclaimer, the term of this patent is extended or adjusted under 35 U.S.C. 154(b) by 0 days.

(21) Appl. No.: 09/131,942

(22) Filed: Aug. 12, 1998

(51) Int. Cl.[7] .................................................. G01R 19/00
(52) U.S. Cl. ................................................ 324/67; 324/326
(58) Field of Search .......................... 324/67, 236, 326; 307/592, 593, 594, 296 R

(56) References Cited

U.S. PATENT DOCUMENTS

| | | | |
|---|---|---|---|
| 4,464,622 | * | 8/1984 | Franklin ................................. 324/67 |
| 4,859,931 | * | 8/1989 | Yamashita et al. ..................... 324/67 |
| 5,457,394 | * | 10/1995 | McEwan ............................... 324/642 |
| 5,512,834 | * | 4/1996 | McEwan ............................... 324/642 |
| 5,917,314 | * | 6/1999 | Heger et al. ............................. 324/67 |

* cited by examiner

*Primary Examiner*—Jay Patidar
*Assistant Examiner*—Subhash Zaveri
(74) *Attorney, Agent, or Firm*—Jackson Walker L.L.P.

(57) ABSTRACT

A portable device for selectively locating a wooden object, a metal object or a live AC wire positioned behind a wall surface covering when the device is moved along a wall surface is disclosed. Wood is detected by changes in effective dielectric constant, metal is detected by changes in magnetic reluctance and a live wire by detecting modulation signals at mains frequency. The device is controlled by a microcontroller to provide discriminating visual and audible signals when each of the kinds of objects are proximate the device.

7 Claims, 6 Drawing Sheets

PORTABLE STUD DETECTOR FOR DETECTING WOOD, METAL, AND LIVE WIRES

BACKGROUND OF THE INVENTION

1. Field of the Invention

The invention relates to a stud detectors.

2. Description of Prior Art

The invention relates more particularly to a stud detector that is capable of detecting wooden studs, metal objects or wires, and live wires carrying an AC current.

Stud detectors are well-known and rely on detecting changes in dielectric constants. The stud detectors are typically used by tradesmen to detect wooden studs or beams that are hidden from view, behind plaster or other wall coverings, by moving the detector across and closely adjacent a wall surface. It is necessary to determine the relative position of the studs so that other construction items or fittings can be securely attached the wall. For example when fitting a ceiling fan, support anchor bolts must, where appropriate, be screwed into ceiling joist that is above and behind the ceiling plaster. It is therefore desirable to locate the ceiling joist without damaging the ceiling coating. A portable stud locating device is fully described in U.S. Pat. No. 4,099,118.

The tradesman may also wish to locate any live electric wires that are likewise hidden from view behind a plastered or covered surface. A device that combines wooden stud detection and live wire location is described in U.S. Pat. No. 4,464,622. The combined device has improved calibration, but a disadvantage that the AC detection is dependent the wood detector circuit operation.

Further, the described combined device of U.S. Pat. No. 4,464,622 is incapable of detecting electric power cables that are disconnected from a mains supply or detecting metallic conduits, strips or other objects that may be important for the tradesman's activities. Such metallic elements may be required in some cases to provide a sound anchorage for a construction addition or wall fitting, for example. In other cases, the metallic elements may represent an impediment to anchorage of any fixings and so must avoided.

SUMMARY OF THE INVENTION

It is an object of the invention to overcome or at least reduce this problem.

According to the invention there is provided a portable device for selectively locating a wooden object, a metal object or a live AC wire positioned behind a wall surface covering when the device is moved along the wall surface, the device comprising means for indicating the presence of wooden objects including, a first capacitor plate, a pair of second capacitor plates on opposite sides of the first capacitor plate and in substantially the same plane as the first capacitor plate, means for producing an output signal representative of a change in the effective dielectric constant between the first capacitor plate and the pair of second capacitor plates as the device is moved along the wall, and means for monitoring the output signal and arranged to indicate a change; means for indicating the presence of metal objects, including means for generating a magnetic field that in use extends into the wall, means for detecting changes in the effective reluctance due to metal objects in the vicinity of the device, and indicating means arranged to provide signals whenever the effective reluctance changes; and means for indicating the presence of a live wire in the vicinity of the device, including a passive antenna for responding to electromagnetic radiation and generating output signals, a bandpass filter for rejecting components of the generated output signals outside a predetermined range of frequencies, means for monitoring an output of the bandpass filter caused by any live wire for providing the indication of the proximity of a live wire.

The indicating means comprise LED's, and/or a loudspeaker controlled to produce discriminating different signals according to what is being detected.

The device is preferably controlled by a single microprocessor.

The microcontroller may be programmed to detect and to indicate the proximity of metal objects only, even when wooden objects are also adjacently present.

The microcontroller may also be programmed to detect and to indicate the proximity of objects according to a priority in the order of live wires, metal objects and wooden objects.

BRIEF DESCRIPTION OF THE DRAWINGS

A portable device for selectively locating a wooden object, a metal object or wire, or a live AC wire behind a wall surface according to the invention will now be described by way of example with reference to the accompanying drawings in which.

DESCRIPTION OF THE PREFERRED EMBODIMENT

The portable device combines circuits and components for detecting wooden and metal objects and live AC wires behind the surface of a wall. The wood detection is carried by measuring changes in the dielectric constant of the wall adjacent its surface to a depth of 2 or 3 cms, say. The metal objects detection is caused by measuring change in magnetic reluctance in the wall surface to a depth of 5 to 8 cms, say. The presence of a live AC electrical wire is detected by measuring modulations generated in a detecting circuit in the device.

Figure 1:
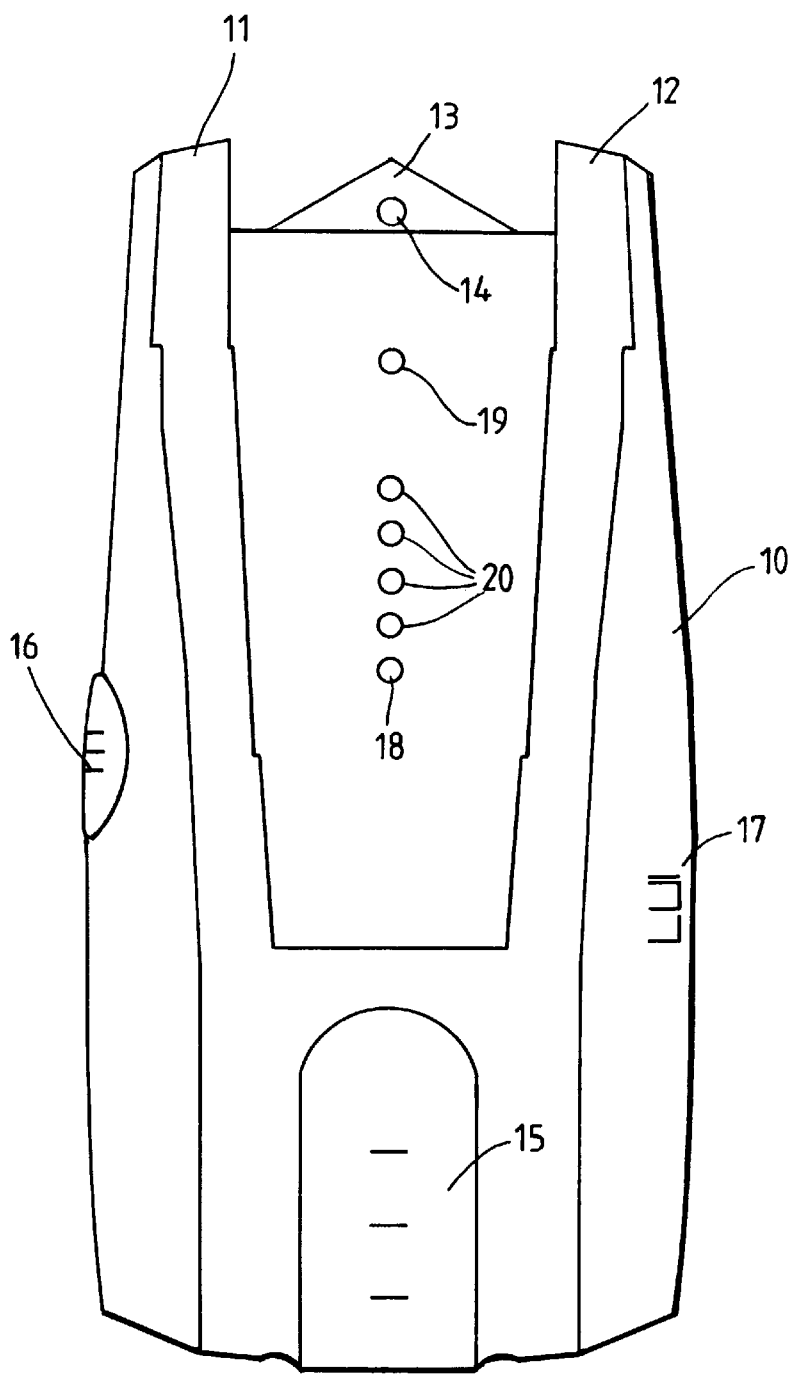
FIG. 1 is an external plan view of the device.

Referring to FIG. 1, the device comprises a housing 10 having outer side protrusion 11 and 12. A central pointed tongue 13 has a marking hole 14 for convenient use when wood, metal and live wires are detected. A belt clip 15 is provided on the housing. An ON-OFF switch 16 and an "AC" switch 17 are positioned on opposite sides of the housing 10.

An array of LED's provides an indication of the operating condition of the device. A green LED 18 flashes after turn ON and automatic calibration of the wood and metal detector is completed. (This is normally while the device is held against the surface of the wall) In practice, the tradesman will then scan over the surface. If wood is detected, the device produces a long bleep and the green LED turns ON permanently. If wood is not detected within 5 seconds, the yellow LED 19 turns ON permanently and three short bleeps will sound. This indicates the device is ready to detect metal objects. If any metals object are detected, four red LED's 20 will turn ON permanently and the green LED 18 will flash. The device produces two bleeps that are repeated. The device will in any event turn OFF after three minutes.

To detect a live wire with this device, the switch 17 must be in an ON position. In other arrangements, it is possible to dispense with the switch 17. In the event of the device moving close to a live wire, the green LED 18 is turned ON permanently and the LED's 20 are switched ON and OFF is sequence. The device produces three bleeps, that are repeated.

Figure 2:
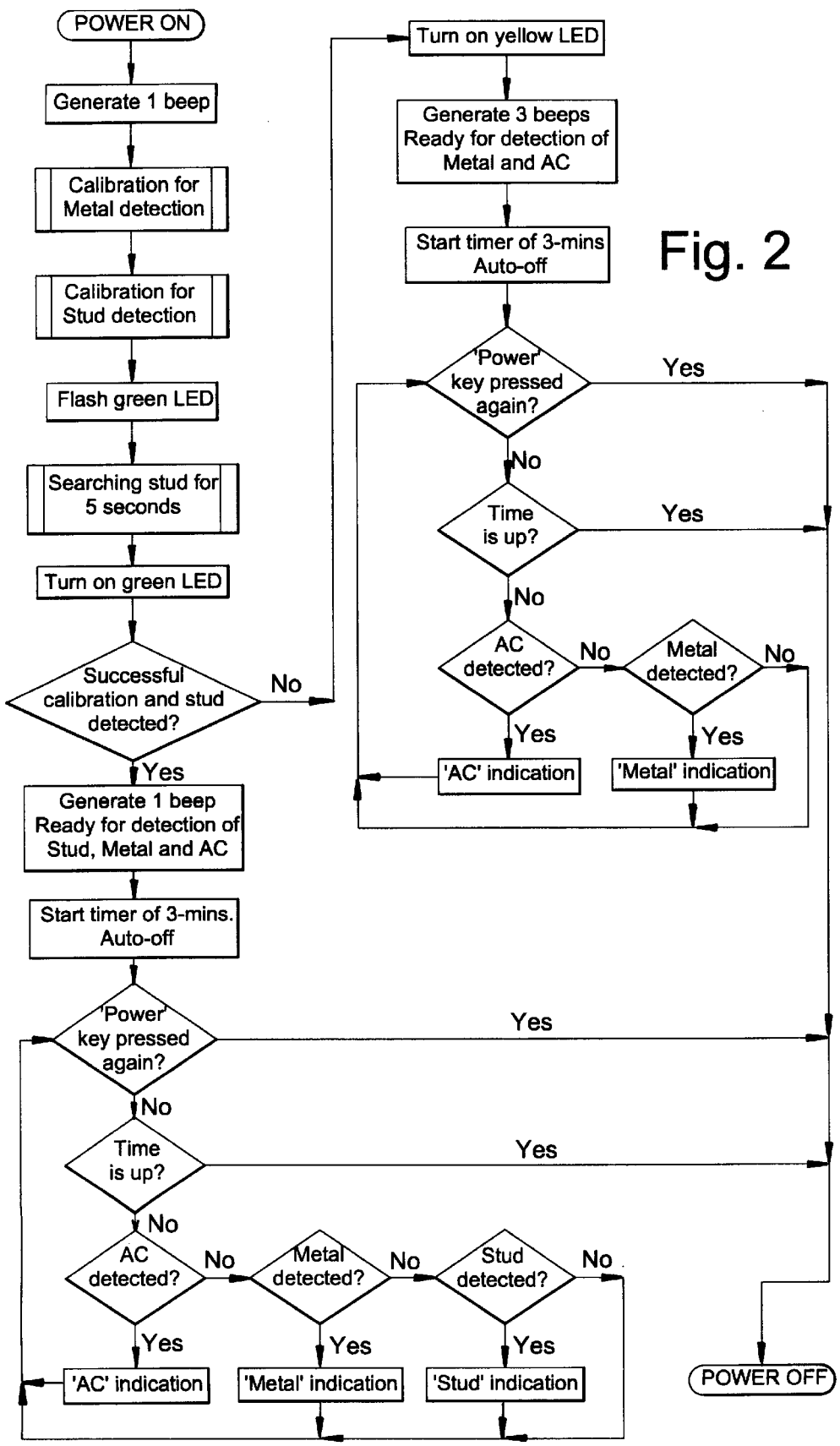
FIG. 2 is a flow chart showing the operation of the device.

This sequence can be better understood by reference to the flow chart in FIG. 2.

In each case the tradesman will return to the positions where the wood, metal or live wire have been located. If the device is scanned at these locations, it is arranged to provide repeated single bleeps for wood, double bleeps for metal, and triple bleeps for a live wire. However, the device is prioritised to detect live wire, metal and wood in that order, as a safety precaution.

Figure 3:
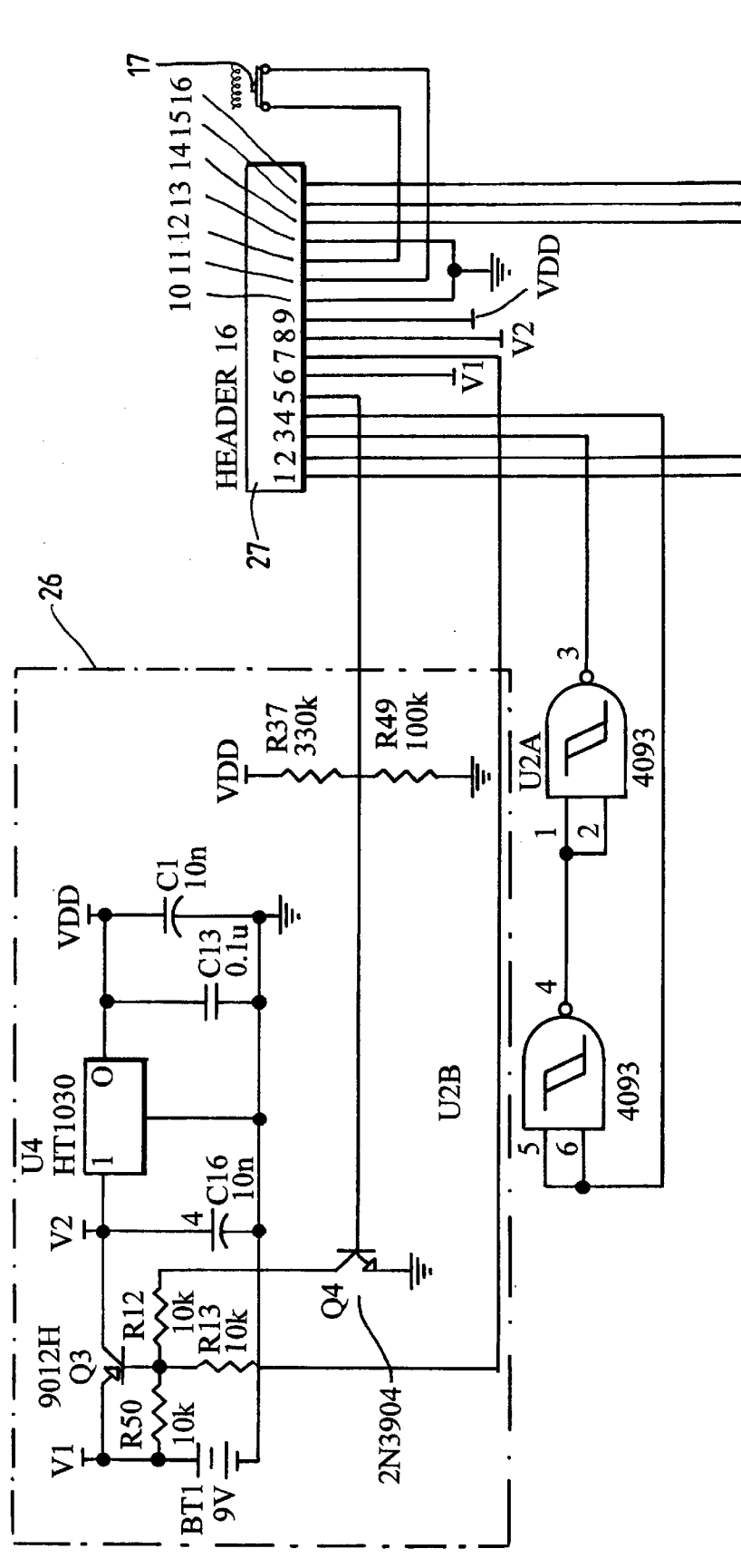
FIG. 3 is a circuit diagram of a wood locating circuit.
Figure 3:
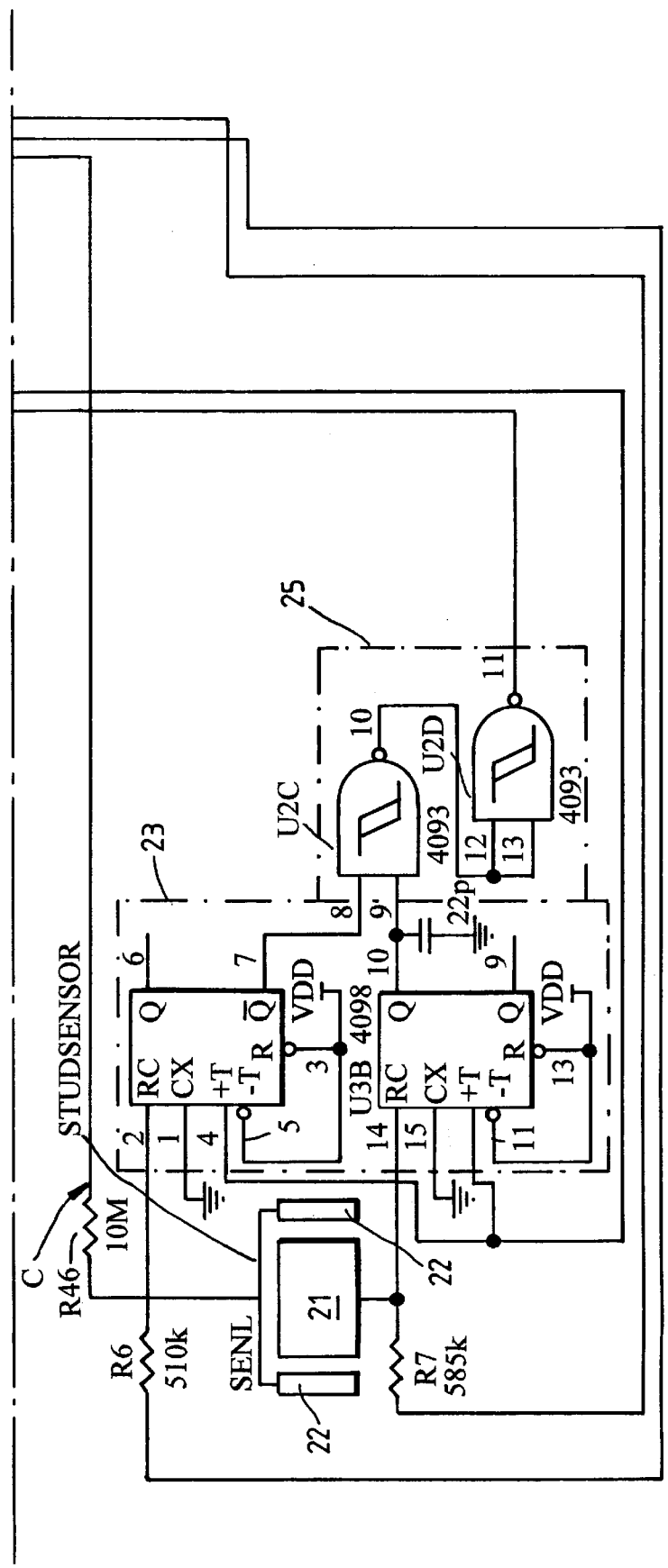

Referring to FIG. 3, a circuit for detecting wooden objects is shown. The circuit includes a first capacitor plate 21 and a pair of second capacitor plates 22 on opposite sides of the capacitor plate 21. The capacitor plates are mounted in substantially the same plane adjacent an underside surface of the housing 10 (FIG. 1). The capacitor plates are connected to a pair of monostable circuits 23, that receive trigger pulses at 30 KHz from a microcontroller 24 shown in FIG. 4. In operation, the output of the monostable circuits 23 varies with changes in the effective dielectric constant of the wall being scanned. The output of each monostable is compared by a logic gate 25. In the event of an increase in the dielectric constant caused by the proximity of a wooden object to the capacitor plates 21 and 22, pulses generated at the logic gate will increase in intensity. The logic gate supplies signals to the microcontroller 24 as explained below.

A power supply and regulator circuit 26 are supplied by a 9 Volt Battery and controlled by the microcontroller 24 via a multi-connector 27.

Figure 4:
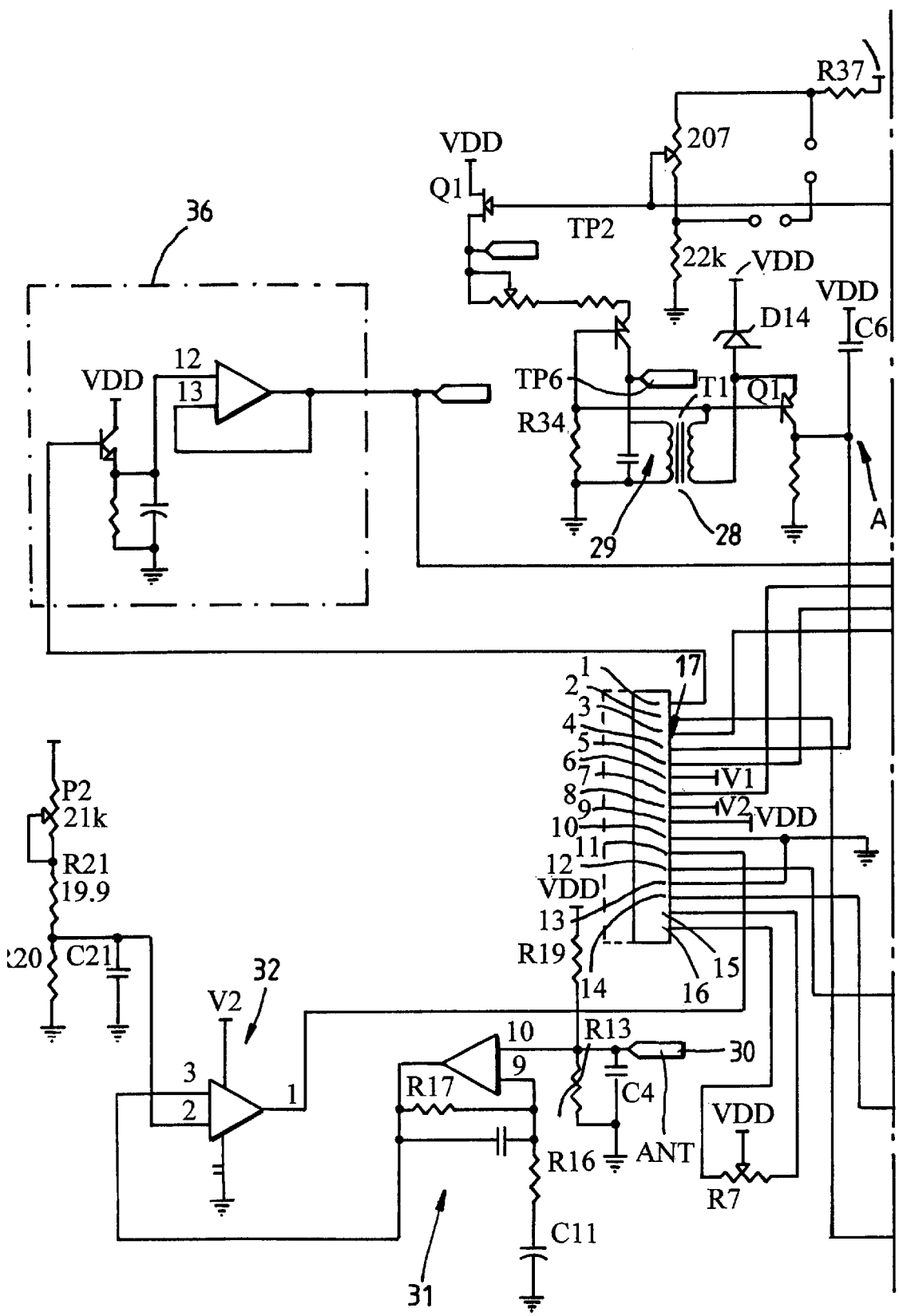
FIG. 4 is a circuit diagram of a metal and live wire locating circuit.
Figure 4:
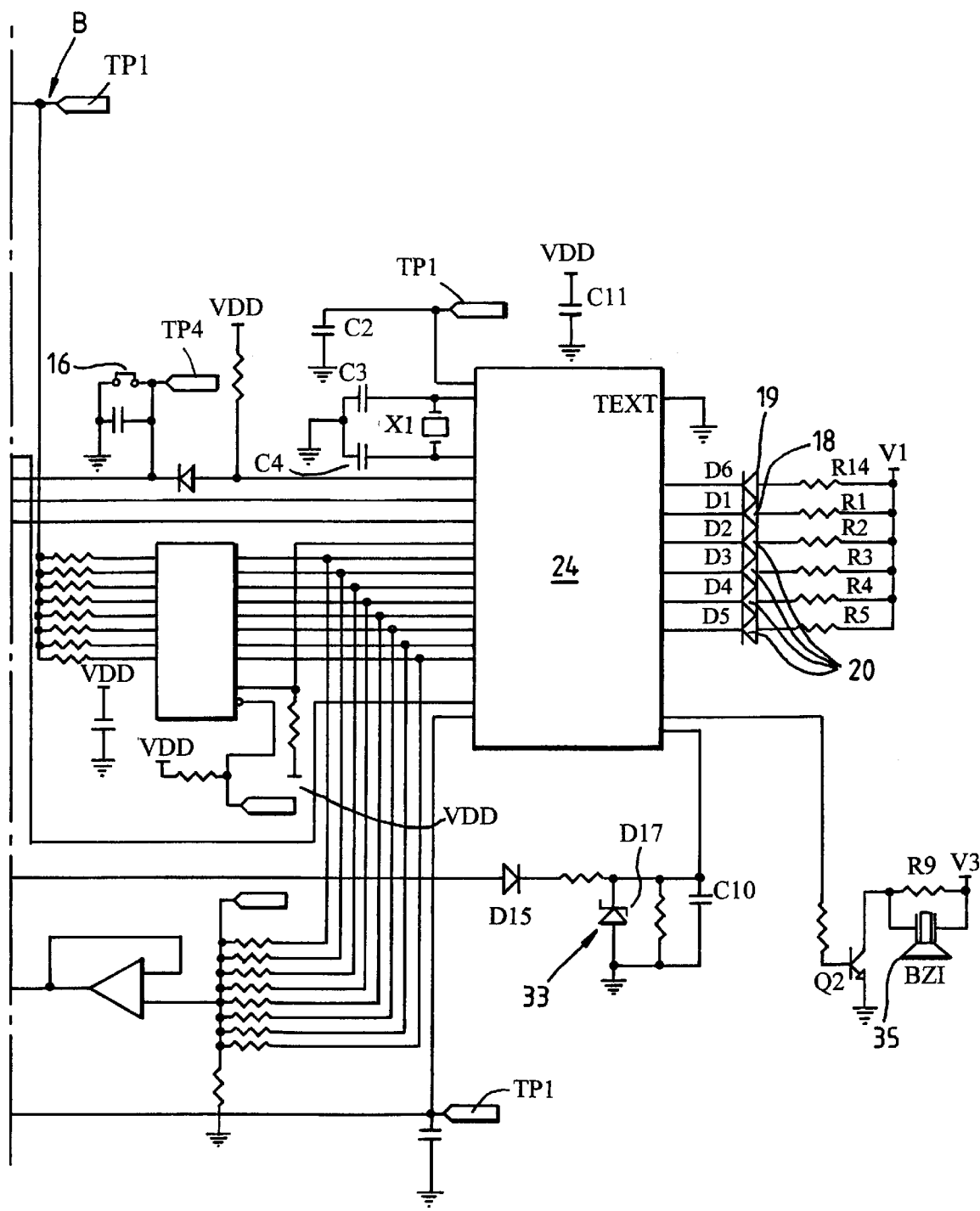

In FIG. 4, the metal object and live wire detectors are shown. The metal detector includes a ferrite core 28 that is positioned across the top of the housing below the pointed tongue 13. A magnetic field is provided in use by the core 28 supplied by a current from the regulated supply. A direct current voltage is developed at A representative of the amplitude of oscillations of the oscillator 29. If a metal object is present in the region of the ferrite core 28, the voltage at A will decrease. Thus, a decrease in the voltage at A serves to locate the proximity of a metal object. This voltage change is monitored by the microcontroller 24.

Figure 5:
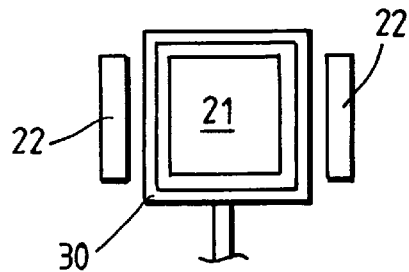
FIG. 5 is a schematic arrangement of an antenna for the device.

The live wire detection circuit includes an antenna 30 (FIG. 5) which for convenience is mounted adjacent the capacitor plates 21 and 22 and connected to a bandpass filter 31. The bandpass filter is set to a bandpass range in the region of 50 to 60 Hz. In the event that a live wire comes into proximity with the antenna 30, a modulating signal is generated and compared with a reference by a comparator circuit 32. An output of the comparator circuit 32 is fed via a smoothing circuit 33 to the microcontroller 24.

The described circuit includes a calibration circuit including a discriminator chip 34. In practice, calibration is carried out as an initial step when the device is first switched ON, as mentioned earlier. The metal detection calibration is carried out first under the control of the microcontroller 24 by automatically setting a suitable voltage at B. The wood detection calibration is likewise carried out automatically in turn by setting a voltage at C (FIG. 3).

The array of LED's are controlled by the microcontroller 24 to provide the appropriate indications during calibration and operation of the device as explained above. A bleeper 35 is likewise controlled by the microcontroller 24 to provide the audible signals.

FIG. 4 also shows an integrating circuit 36 that receives output pulses from the logic gate 25 (in FIG. 3) and converts the pulses into a direct current voltage for supplying to the microcontroller 24.

The microcontroller 24 is programmed to control the operation of the device to detect and to indicate in a discriminating manner whether a wooden object, a metal object or a live wire is in the proximity of the device as it is moved in practice over a surface of a wall. In particular, if the switch 17 is OFF, the microcontroller 24 will automatically detect and provide an indication of metal objects only, even if wooden objects are also proximate the device. If the switch 17 is ON, the microcontroller is arranged to provide the device with indication signals that identify the presence of a live wire even if metal objects (or wooden objects) are also present.

I claim:

1. A portable device for selectively locating a wooden object, a metal object or a live AC wire positioned behind a wall surface covering when the device is moved along the wall surface, the device comprising means for indicating the presence of wooden objects including, a first capacitor plate, a pair of second capacitor plates on opposite sides of the first capacitor plate and in substantially the same plane as the first capacitor plate, means for producing an output signal representative of a change in the effective dielectric constant between the first capacitor plate and the pair of second capacitor plates caused be the presence of the wooden object as the device is moved along the wall, means for monitoring the output signal and arranged to indicate the change; means for indicating the presence of metal objects, including means for generating a magnetic field that in use extends into the wall, means for detecting changes in the effective reluctance due to metal objects in the vicinity of the device, and indicating means arranged to provide signals whenever the effective reluctance changes; means for indicating the presence of said live wire in the vicinity of the device, including a passive antenna for responding to electromagnetic radiation and generating output signals, a bandpass filter for rejecting components of the generated output signals outside a predetermined range of frequencies, means for monitoring an output of the bandpass filter caused by said live wire for providing the indication of the proximity of live wire.

2. A portable device according to claim 1, in which the indicating means comprise LED's.

3. A portable device according to claim 1, in which the indicating means comprise a loudspeaker controlled to produce discriminating different signals according to what is being detected.

4. A portable device according to claim 1, in which the device is controlled by a single microprocessor.

5. A portable device according to claim 1, in which the microcontroller is programmed to detect and to indicate the proximity of metal objects only, even when wooden objects are also adjacently present.

6. A portable device according to claim 1, in which the microcontroller is programmed to detect and to indicate the proximity of objects according to a priority in the order of live wires, metal objects and wooden objects.

7. A portable device according to claim 4, in which microprocessor is programmed to carry out calibration of the device as an initial step when the device is first switched on.

* * * * *